July 14, 1936.     L. ZAIGER     2,047,658
SUCTION CUP
Filed Dec. 27, 1935
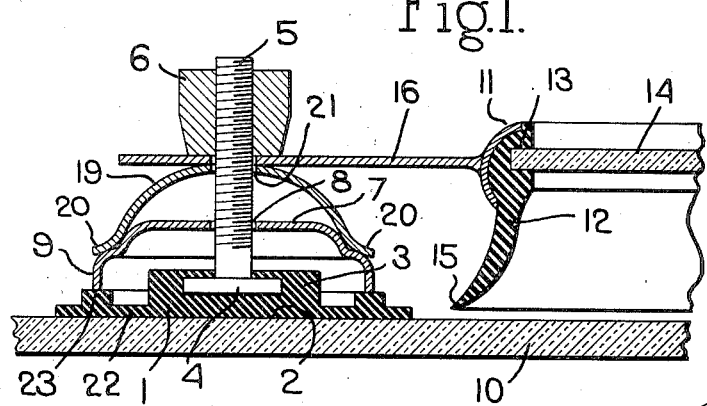
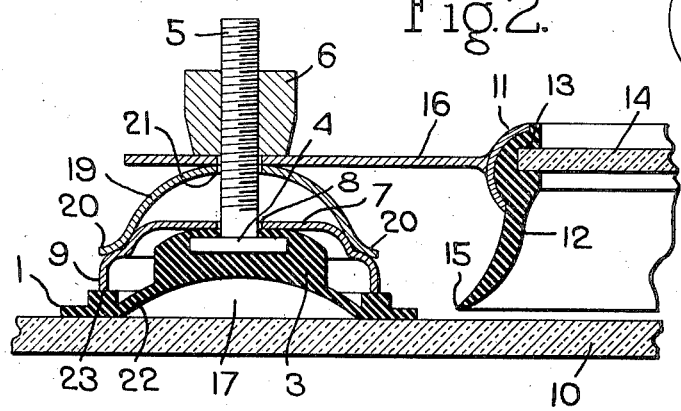
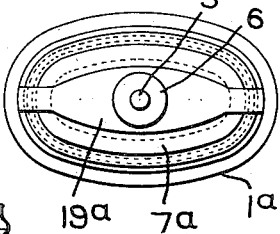
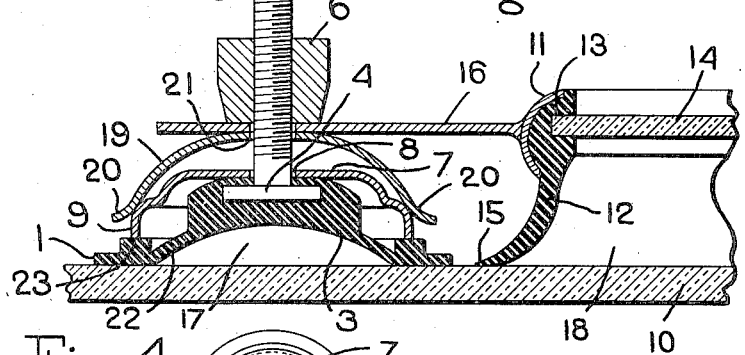
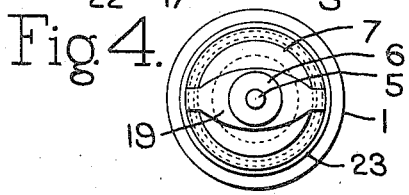
Inventor.
Louis Zaiger
by Heard Smith & Tennant.
Attys.

Patented July 14, 1936

2,047,658

UNITED STATES PATENT OFFICE 2,047,658

SUCTION CUP

Louis Zaiger, Lynn, Mass.

Application December 27, 1935, Serial No. 56,336

3 Claims. (Cl. 248—206)

This invention relates to suction cups which are used for attaching an article to a sheet or pane of glass, and particularly to the type of suction cup in which the rubber suction member normally has a flat suction face and which embodies a cup-shaped compression member having its edges resting against the back side of the rubber body, together with means for drawing the central portion of the rubber body away from the glass to produce the suction and at the same time applying pressure to the outer portion of the body through the compression member.

One object of the invention is to provide a novel construction by which the article to be attached to the glass may be adjusted toward the glass after the suction cup has been applied thereto.

A suction cup embodying this invention is adapted to be used for various purposes but it is especially useful for attaching so-called defrosters to the windshields of automobiles, and by reason of the construction embodied in the invention the suction cup is adapted to be used for attaching defrosters of different shapes and sizes to the windshield.

Most defrosters are made with a rubber sealing strip having a groove to receive the edge of the glass pane of the defroster and also having a flexible lip intended for engagement with the windshield. These defrosters are also commonly formed with arms which carry the suction cups, and in order that the defroster may be most efficient it is necessary that when it is attached to the windshield the flexible lip of the sealing strip should be pressed against the windshield to make a tight joint.

In different makes of defrosters the arms carrying the suction cups may be at different distances from the windshield when the defroster is in place and unless the suction cup is properly proportioned it may not hold the edge of the flexible lip of the sealing strip firmly against the windshield. In the device embodying this invention the suction cup is constructed so that after it has been attached to the windshield by creation of the suction chamber between the suction cup and the windshield, the arm of the defroster or the article to be attached to the windshield may be adjusted toward the windshield, if necessary, to bring the flexible lip of the defroster firmly against the windshield.

In order to give an understanding of the invention I have illustrated in the drawing a selected embodiment thereof which will now be described after which the novel features will be pointed out in the appended claims.

In the drawing:

Fig. 1 is a sectional view through a suction cup embodying my invention and also showing a portion of the defroster in section, said figure showing the parts when the suction cup is first placed against the windshield but before it is attached thereto.

Fig. 2 is a similar view showing the suction cup attached to the windshield by the production of the suction chamber between the cup and the windshield.

Fig. 3 is a similar view showing the adjustment which is made to bring the flexible lip of the defroster firmly against the windshield.

Fig. 4 is a plan view of the suction cup on a small scale.

Fig. 5 is a plan view of a suction cup having a different shape from that shown in Fig. 4.

Fig. 6 is a view illustrating a helical spring which may be employed instead of the semi-elliptic spring.

My improved suction cup comprises a suction member 1 of rubber which normally has a flat continuous suction face 2. The suction member is formed with the thickened central portion 3 in which is embedded the head 4 of a screw-threaded stud 5, the latter having a clamping nut 6 screw-threaded thereto. 7 indicates the compression member which is a cup-shaped member enclosing the thickened central portion 3 of the suction cup, and having an opening 8 through which the screw-threaded stem 5 extends. The edge 9 of this compression member rests against the back side of the body portion 1 as usual in devices of this type. 10 indicates the glass to which the suction cup is to be secured and 11 is the article to be attached to the glass 10 through the medium of the suction cup.

In the construction shown in the drawing the article 11 is a defroster such as is used on the windshields of automobiles, and it is provided with a rubber sealing strip 12 having on its inner face a groove 13 to receive the edge of the glass pane 14 of the defroster. This sealing strip is also formed with the flexible lip 15 adapted to engage with the windshield 10 and form a tight joint therewith. The defroster is further provided with an arm or extension 16 to which the suction cup is attached, said arm being provided with an opening through which the stem 5 extends and the clamping nut 6 being secured to the stem 5 on the exterior of the arm 16.

In attaching a suction cup of this type to the windshield the flat suction face 2 of the body member 1 is placed against the glass 10 and the nut 6 is then tightened which results in drawing the stem 5 and the central portion 3 of the rubber member backwardly away from the glass 10, thereby creating the suction chamber 17 as shown in Fig. 2. During this operation the force required for pulling the central portion of the suction cup away from the glass to provide the suction chamber 17 produces a pressure against the compression member 7 which is transmitted to the outer portion of the rubber member 1 through the edge 9 of the suction member, thereby clamping the outer portion of the suction member firmly to the glass 10 and preventing any possible leakage of air into the vacuum chamber 17.

As stated above in order that the defroster herein shown may be most effective it is desirable that the flexible lip 15 should be held pressed against the windshield 10, as shown in Fig. 3, so as to prevent the escape of the heated air within the space 18 between the glass 10 and the glass pane 14 of the defroster. To provide for this I employ a spring element between the arm 16 and the compression member 7, said spring element being constructed so that it will not be appreciably compressed by the force required to pull the central portion 3 of the suction member away from the glass to produce the suction member 17. Such spring element may have any suitable or desirable construction. In Figs. 1, 2, 3, and 4 I have shown a semi-elliptic spring 19 having an opening 21 through which the stem 5 extends, the two arms 20 of the spring resting against the back side of the compression member. In Fig. 6 there is shown a helical spring 30 which may be employed instead of the semi-elliptic spring 19.

In the operation of the device the suction member is placed in position with its flat face 2 resting against the glass 10, and the nut 6 is then tightened, thereby drawing the central portion 3 of the suction member away from the glass and into contact with the central portion of the compression member 7, as shown in Fig. 2, thereby forming the suction chamber 17. During this operation the spring 19 is not compressed to any appreciable extent but by this operation the suction cup is securely attached to the glass 10, and if it is found that the flexible lip 15 is still spaced from the glass 10, as shown in Fig. 2, then the nut 6 is further tightened which will result in compressing and flattening the spring 19 and forcing the arm 16 and the defroster toward the glass 10. This tightening of the nut 6 is continued until the flexible lip 15 is brought firmly against the windshield 10. The continued tightening of the nut 6 from the position shown in Fig. 2 to that shown in Fig. 3 does not in any way affect the holding qualities of the suction cup because the relative position of the suction cup and the compression member are not changed by this further tightening of the nut 6. While I have shown a semi-elliptic spring between the article to be held and the compression cup, yet it will be obvious that other types of spring, such as the helical spring 30, may be employed without departing from the invention.

The suction member 1 is shown as being thinner in a zone 22 surrounding the thickened central portion 3 and situated within the annular portion 23 of the suction member against which the edge 9 of the compression member rests. The advantage of making the suction member thinner in this zone is to facilitate the deforming of the suction member from its flat shape shown in Fig. 1 to its operative shape shown in Fig. 2. The presence of this thinner zone 22 makes it easier to pull the central thicker portion of the suction member away from the glass 10. The suction member is also formed with a relatively thin peripheral zone exterior to the rib or annular portion 23, the advantage of which is that this peripheral zone provides additional surface contact between the suction face of the suction member and the glass which increases the effectiveness of the device.

The suction member 1 may be either circular in shape, as shown in Fig. 4, or may have an elongated or elliptical shape, such as shown at 1a in Fig. 5, in which case the compression member 7a and spring 19a would have a corresponding shape. The use of the compression member enables me to vary the shape of the suction member because when the device is in operation the edge of the compression member is firmly clamped against the suction member regardless of its shape and an effective suction chamber can be formed in an elongated suction member as well as in one having a circular shape.

I claim:

1. A suction cup for attaching an article to a glass support, said suction cup comprising a body of rubber having a normally flat suction face, a threaded stud anchored in said rubber body adapted to extend through the article to be attached to the glass support, a cup-shaped compression member having its edge engaging the marginal portion of the rubber body and through which the threaded stud extends, a nut screw-threaded to the stud and adapted, when tightened, to draw the central section of the suction member away from the support to form a suction chamber, and a spring member interposed between the article to be supported and the compression member whereby after the suction chamber has been produced a further tightening of the nut moves the article to be supported bodily toward the glass support.

2. A suction cup for attaching an article to a glass support, said suction cup comprising a body of rubber having a normally flat suction face, a threaded stud anchored in said rubber body and adapted to extend through the article to be attached to the glass support, a cup-shaped compression member having its edge engaging the body and through which the threaded stud extends, a nut screw-threaded to the stud and adapted, when tightened, to draw the central section of the suction member away from the support to form a suction chamber, and a yielding member interposed between the article to be supported and the compression member whereby after the suction chamber has been produced a further tightening of the nut moves the article to be supported bodily toward the glass support.

3. A suction cup for attaching an article to a support, said suction cup comprising a rubber body member having a normally flat continuous unbroken suction face and a relatively thick central portion, and also having an annular rib on its back face spaced from the relatively thick central portion, a threaded stud having a head embedded in the thick portion, a cup-shaped compression member enclosing the thicker portion and having its edge spaced therefrom and bearing against said rib, said screw-threaded stud extending through the compression member and through the article to be supported, and a nut screw-threaded to the stud and adapted, when tightened, to draw the central thick portion into the compression member, said body member having a zone of reduced thickness between the central thick portion and the rib and a peripheral zone of reduced thickness exterior to said rib.

LOUIS ZAIGER.